MOLAR RELATIONSHIP BETWEEN Mg AVAILABLE IN THE FEED LIQ. AND THE Mg/P$_2$O$_5$ MOLAR RATIO IN THE PRODUCT
200°C - 2 HRS.

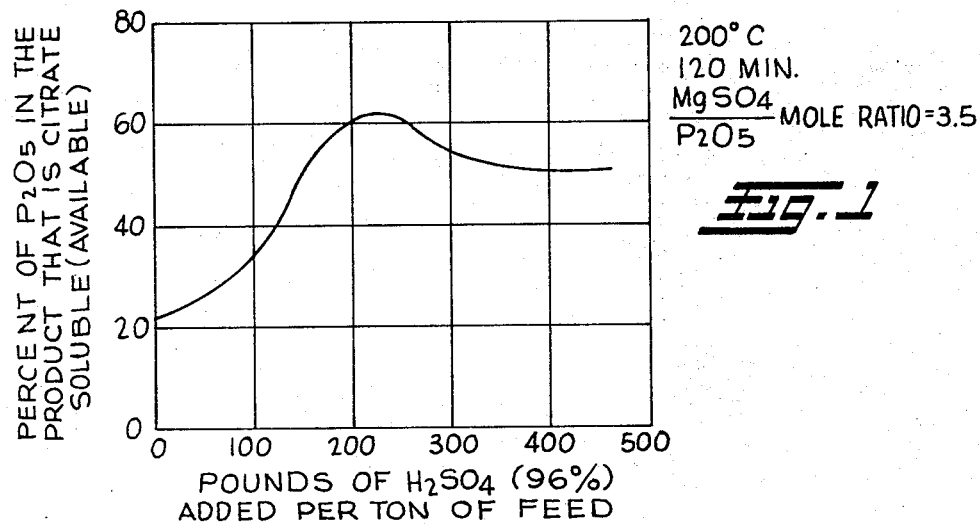
Fig. 1 — RELATIONSHIP BETWEEN CITRATE SOLUBLE CONTENT OF PRODUCT AND THE AMOUNT OF $H_2SO_4$ ACID ADDED.
200° C
120 MIN.
$\dfrac{MgSO_4}{P_2O_5}$ MOLE RATIO = 3.5
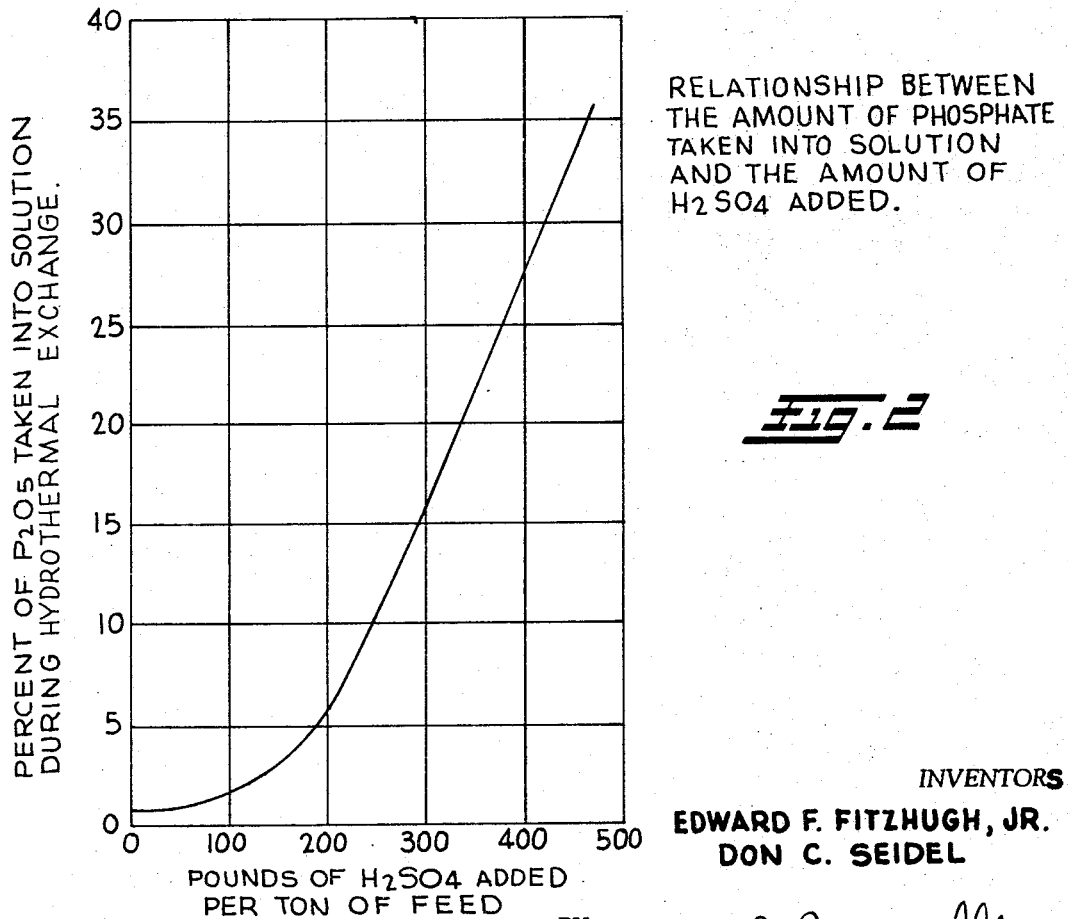
Fig. 2 — RELATIONSHIP BETWEEN THE AMOUNT OF PHOSPHATE TAKEN INTO SOLUTION AND THE AMOUNT OF $H_2SO_4$ ADDED.
INVENTORS
EDWARD F. FITZHUGH, JR.
DON C. SEIDEL

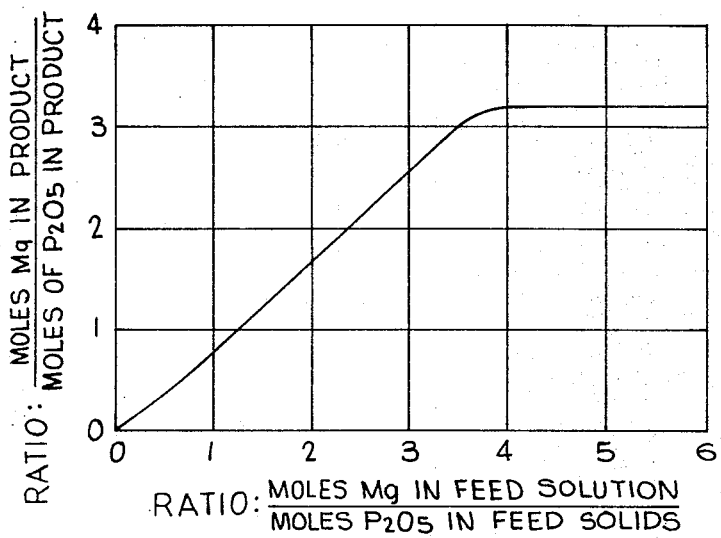

Fig. 3

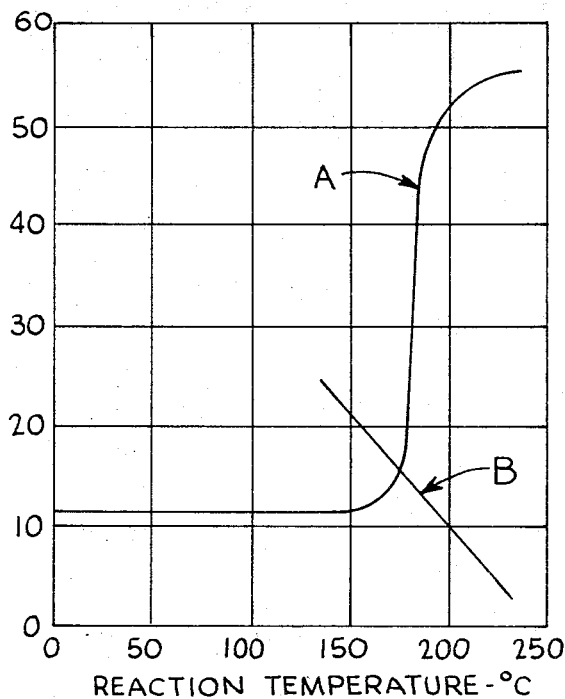

A - RELATIONSHIP BETWEEN REACTION TEMP. AND CITRATE SOLUBLE P$_2$O$_5$ CONTENT OF PRODUCT.

B - RELATIONSHIP BETWEEN REACTION TEMP. AND PERCENTAGE OF P$_2$O$_5$ TAKEN INTO SOLUTION DURING THE REACTION.

(CONDITIONS DESCRIBED IN EXAMPLE V)

Fig. 4

INVENTORS
EDWARD F. FITZHUGH, JR.
DON C. SEIDEL

BY Walter J. Monacelli
ATTORNEY

Dec. 1, 1970   E. F. FITZHUGH, JR., ET AL   3,544,301
PROCESS FOR CONVERTING PHOSPHATE ROCK TO FERTILIZER
Filed Oct. 5, 1967   3 Sheets-Sheet 3

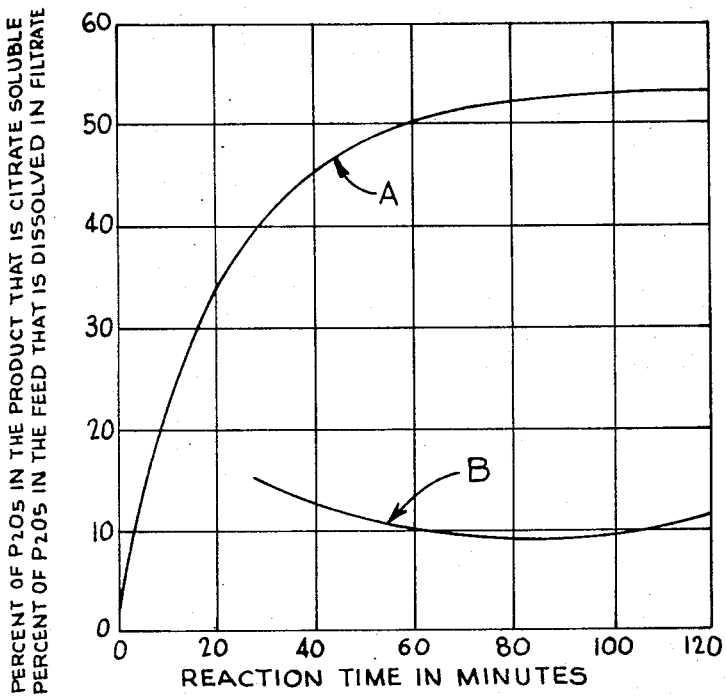

A - RELATIONSHIP BETWEEN REACTION TIME AND AVAILABLE $P_2O_5$ IN THE PRODUCT.

B - RELATIONSHIP BETWEEN REACTION TIME AND THE AMOUNT OF $P_2O_5$ DISSOLVED DURING THE REACTION.

(SEE EXAMPLE 6 FOR CONDITIONS)

Fig. 5

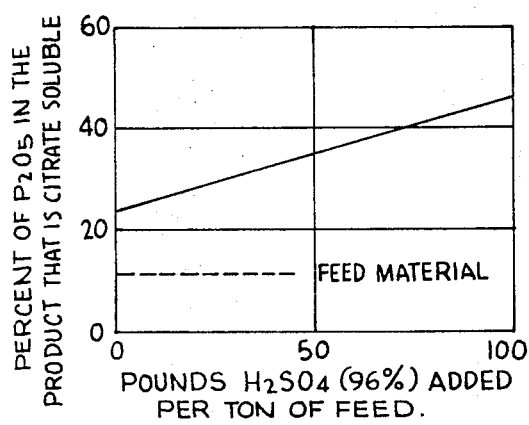

RELATIONSHIP BETWEEN CITRATE SOLUBLE CONTENT OF THE PRODUCT AND THE AMOUNT OF ACID ADDED. (SEA WATER BITTERN)

(CONDITIONS DESCRIBED IN EXAMPLE X)

Fig. 6

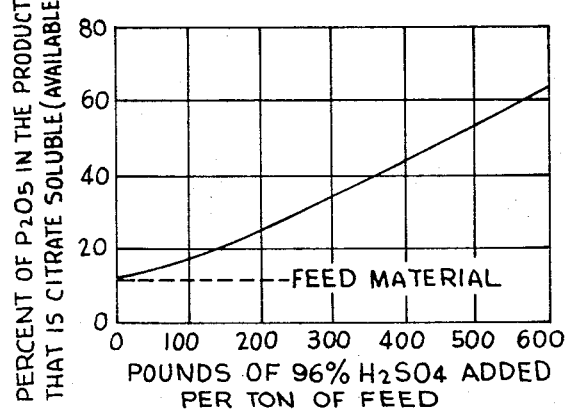

RELATIONSHIP BETWEEN CITRATE SOLUBLE CONTENT OF PRODUCT AND THE AMOUNT OF ACID ADDED DURING A DIRECT ACIDULATION OF A PHOSPHATE ROCK CONCENTRATE.

Fig. 7

INVENTORS
EDWARD F. FITZHUGH, JR.
DON C. SEIDEL

BY Walter J. Monacelli
ATTORNEY

United States Patent Office 3,544,301
Patented Dec. 1, 1970

3,544,301
PROCESS FOR CONVERTING PHOSPHATE ROCK TO FERTILIZER
Edward F. Fitzhugh, Jr., Cleveland Heights, and Don C. Seidel, Golden, Colo., assignors to Republic Steel Corporation, Cleveland, Ohio, a corporation of New Jersey
Filed Oct. 5, 1967, Ser. No. 673,219
Int. Cl. C05b 11/06
U.S. Cl. 71—39                           20 Claims

ABSTRACT OF THE DISCLOSURE

This invention comprises an improved process for converting calcium phosphate rock to a fertilizer having a substantial proportion of citrate soluble phosphate therein, the process of this invention being improved over prior art processes by virtue of the very small amount of acid, preferably sulfuric acid, that is used for this conversion and by utilizing magnesium sulfate as the principal reagent for converting the phosphate to a form which has greater utility as a fertilizer. The improved process of this invention is made possible by the discovery that a temperature of at least 170° C., preferably 180–210° C., effects the $MgSO_4$ exchange reaction which results in the conversion desired for fertilizing purposes. Although the citrate soluble percentage effected by this process is lower than that obtained in the production of normal superphosphate, this has distinct advantages as pointed out hereinafter, and also has the tremendous economic advantage of a much higher efficiency in the use of acid to produce phosphate of fertilizing quality.

This invention relates to an improved process for making phosphate fertilizer. More specifically it relates to an improved process for converting phosphate rock to fertilizer by a process having a great economy in the amount of acid being used. Still more particularly, this invention relates to a process of converting phosphate rock to phosphate fertilizer which employs relatively little acid compared to the amount previously used and instead employs magnesium sulfate solutions which are available as waste or by-products from various sources.

Phosphate rock is primarily calcium phosphate in a form which upon application to soil releases very little of its phosphate content unless the soil happens to be very acidic. In order to convert the phosphate rock to a form in which the phosphate becomes available for fertilizing purposes, it has been the practice to treat phosphate rock with 1200–1400 pounds of concentrated sulfuric acid per ton of phosphate rock. The resultant superphosphate has an appreciable content of available phosphate which can be abstracted or absorbed by the soil.

According to a standard (A.O.A.C.) test for measuring available phosphate, this is generally referred to as "citrate soluble." This is determined by testing the percentage of the total phosphate content of the phosphate material which can be dissolved in a neutral ammonium citrate solution. The percentage of total phosphate content which is dissolved in such a test is referred to as the "citrate soluble" percentage. For example, if 100 parts of normal superphosphate has a total phosphate content of 20 parts $P_2O_5$ and 10 parts are dissolved in ammonium citrate solution, the citrate soluble percentage is expressed as 50% of the total phosphate content.

Because of the cost of the large amount of acid normally required, the preparation of normal superphosphate is a relatively expensive operation and various attempts have been made to reduce the amount of acid used for this purpose. Obviously relative economies in the amount of acid are desirable even in producing a phosphate product having a lower percentage of citrate soluble phosphate. For a typical example, 751 pounds of 66° Bé. $H_2SO_4$ may be reacted with 88 lb. of phosphate rock to produce with incidental water of crystallization one ton of normal superphosphate having a total phosphate content of 20% $P_2O_5$, of which the citrate soluble percentage is 80%. This amount of acid produces 0.16 ton of available $P_2O_5$.

However, if the same 751 lbs. of 66° Bé. $H_2SO_4$ is reacted with 14256 lbs. (instead of the original 1188 lbs.) of the same phosphate rock to produce a product having a total phosphate content of 20% $P_2O_5$ for which the citrate soluble percentage is 50%, this same amount of acid is then producing 1.2 tons of available $P_2O_5$, as compared to 0.16 ton in the first process. The economic advantage of the second process is obvious since the same amount of acid produces 7.5 times as much available phosphate.

Moreover, in certain areas of heavy rainfall, the high solubility of the normal superphosphate can be a disadvantage, since most of it will be washed away. In such areas certain phosphates having a lower citrate soluble value will have the advantage of longer retention of their fertilizer value.

Furthermore, in many areas, there are waste or by-product magnesium sulfate solutions, such as sea water bitterns, waste solutions from nickel recovery processes, etc. Consequently the use of the sulfate content of such waste liquors and the simultaneous addition of magnesium to the fertilizer would be of distinct advantage. This is of particular importance for use in those areas throughout the world where the soil is deficient in magnesium. In such areas, magnesium in the form of dolomite or magnesium sulfate has at times been added in attempts to overcome this deficiency.

In accordance with the present invention, it has now been found that calcium phosphate rock can be treated with magnesium sulfate solutions and simultaneously with relatively small amounts of acid to produce phosphate fertilizers having citrate soluble percentages of 50% or more. Most surprisingly, it has been found that these advantageous results can be effected by heating the phosphate rock at a temperature of at least 170° C., preferably 180–210° C. The mole ratio of $MgSO_4/Ca_3(PO_4)_2$ is advantageously at least 2, preferably at least 3. Under optimum conditions, it is found preferable to use a ratio of 3–3.5 moles of $MgSO_4$ per mole of $Ca_3(PO_4)_2$. In another manner of expressing preferred amounts of $MgSO_4$, generally 15–20%, preferably 16–17% excess $MgSO_4$ over the stoichiometric amount gives best results. The resultant solid product contains some of the original phosphate rock, magnesium orthophosphate or related compounds such as magnesium acid phosphate and calcium sulfate. While sulfuric acid is preferred, various other acids can be used, such as for example, phosphoric, nitric, hydrochloric acids, etc. Advantageously at least 100 pounds of 96% sulfuric acid, or equivalent amount of other acid, is used per ton of phosphate rock. With feed materials having a low phosphate content effective sulfuric acid additions can even be as low as 50 lbs./ton.

The main reaction can be represented schematically as follows:

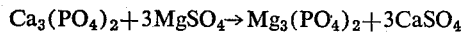

$$Ca_3(PO_4)_2 + 3MgSO_4 \rightarrow Mg_3(PO_4)_2 + 3CaSO_4$$

While this reaction can proceed without acid, the reaction rate is accelerated tremendously in the presence of acid, with the amount of acid being only a small fraction of the amount used to produce normal superphosphate.

The accompanying drawings illustrate the effect of various conditions in the practice of this invention.

FIG. 1 shows a curve plotting the values obtained for the portion of the total phosphate content in the product that is citrate soluble, the respective values thereof being plotted according to the number of pounds of 96% sulfuric acid used per ton of phosphate rock feed.

FIG. 2 shows a curve plotted for the values obtained for the percent of phosphate taken into solution during the reaction varying according to the number of pounds of 96% sulfuric acid used per ton of phosphate rock feed.

FIG. 3 shows a curve obtained by plotting the values for the ratio of moles of Mg in the product per mole of phosphate in the product varying according to the ratio of moles of Mg in the feed solution per mole of phosphate in the phosphate rock feed.

FIG. 4 shows two curves plotted for different reaction temperatures, Curve A showing the percentage of citrate soluble phosphate produced at various reaction temperatures, and Curve B showing the percentage of the phosphate feed that is taken into solution during the reaction.

FIG. 5 shows two curves plotted according to variations in the reaction time. The first curve shows a plotting of the percent of phosphate in the product that is citrate soluble, and the second curve shows the percent of phosphate in the feed that is dissolved during the reaction period.

FIG. 6 shows a curve produced by plotting that percentage of the total phosphate in the product which is citrate soluble versus variations in the amount of sulfuric acid used in treating the phosphate rock.

FIG. 7 shows a curve plotted for percent citrate soluble phosphate in a product produced by the direct acidulation (with sulfuric acid but without magnesium sulfate) versus the pounds of sulfuric acid per ton of phosphate rock feed.

While various particle sizes of rock can be used, it is generally preferred to have the phosphate rock in finely divided particles, the rate of reaction being favored by having the large surface areas that go with fine particle size. Generally particle sizes of less than 100 mesh (Tyler) are preferred. A typical phosphate rock that can be used is Florida phosphate concentrate having a phosphate content of 30–33% calculated as $P_2O_5$. Phosphate rock having higher or lower phosphate contents can also be used with corresponding variations in non-phosphate portions being present in the final product.

As previously indicated, waste magnesium sulfate ($MgSO_4$) solutions can be used, preferably containing about 175–200 gm./l. $MgSO_4$. However, in many of the reactions described hereinafter, these solutions are synthetically prepared in order to have them identical for comparative purposes.

Other materials can be present in the $MgSO_4$ solutions, such as NaCl, $MgCl$, etc., without interfering with the desired reaction. In some cases results appear to be favored by the presence of such salts, possibly because of their effect on the relative solubilities of various reagents and products.

While various concentrations of sulfuric acid can be used, primarily to produce a pH favoring the reaction, it is generally desirable to use concentrated sulfuric acid, advantageously about 96%.

It is also possible to generate the desired acid in situ during the hydrothermal exchange reaction. For example, elemental sulfur, pyrite or other suitable starting material can be added to the feed slurry and converted to sulfuric acid by passing a stream of air through the pulp during the reaction period, as illustrated below.

When the reagent solutions are primarily sulfate, the reactor vessel can be made of 316 stainless steel. However, where chlorides are present in the reagent mixture, a titanium surface should be used in the areas of the reactor which will be wetted by the reaction mixture.

As indicated elsewhere herein, the temperature is advantageously at least 170° C., preferably in the range of 180–210° C. Obviously, therefore, the reaction must be conducted in pressure equipment. While temperatures above 200° C. can be used, the ambient steam pressures for temperatures above 200° C. make it undesirable to use excessively high temperatures. Because of the tendency of the salt in solution to raise the boiling point of the solution, the pressure is generally a little lower than the ambient pressure normally associated with the corresponding temperature.

The magnesium orthophosphate product of this invention can be observed, by suspension in oil and examination under a microscope, to be crystals which are diamond shaped but flat and very thin. X-ray diffraction studies have also indicated the presence of magnesium phosphates in the product.

The process of this invention can best be illustrated by the following examples. These examples are intended merely for illustrative purposes and are not intended to restrict the scope of the invention or the manner in which it can be practiced. Unless specifically provided otherwise, references to parts and percentages are by weight.

EXAMPLE I

A 100 gram sample of —100 mesh (80% having size of 128 microns or less) Florida phophate concentrate, having a phosphate content of 33.3% expressed as $P_2O_5$, is slurried with 500 ml. of a magnesium sulfate solution containing 41.2 g./l. of Mg++ion (203 g./l. $MgSO_4$). This slurry, therefore, contains about 3.6 moles of $MgSO_4$ per mole of phosphate expressed as $P_2O_5$ present. Sulfuric acid is then added to this slurry in sufficient amount to give a ratio of 200 lbs. of 96% $H_2SO_4$ per ton of phosphate concentrate. This acidic slurry which has a pH of about 2.4 is transferred to a 2-liter autoclave made of 316 stainless steel and having a double impeller. The reactor is a standard one commercially available as Parr 2L Reactor 316 SS. The reactor is closed, the agitator is started, and the slurry is heated to 210° C. and maintained at this temperature for 2 hours. At the end of this 2-hour period, the reactor is cooled quickly with water to "quench" the reaction. The terminal pH of the slurry is approximately 5.4. The cooled product slurry is filtered, and the filter cake is washed at least four times with 50 ml. of water each time. The washed product is dried at 100° C. to give a product weighing 178.0 gm. Analysis shows that the product contains:

| | Percent |
|---|---|
| $P_2O_5$ | 17.6 |
| Mg | 8.92 |
| $SO_4$ | 37.5 |
| CaO | 27.1 |
| F | 2.14 |
| $SiO_2$ | 2.94 |

Further analysis also indicates that 51.6% of the phosphate is soluble in neutral ammonium citrate (AOAC method). (Approximately 10% of the phosphate in the feed material is citrate soluble.) Microscopic and X-ray diffraction studies indicate that the following compounds are present in the product:

$CaSO_4$ (anhydrite)
$Mg_3(PO_4)_2 \cdot nH_2O$
$SiO_2$ (silica)
Apatite

The following compositional analysis is calculated from the analytical data:

|  | Percent |
|---|---|
| $CaSO_4$ | 53.2 |
| $CaF_2$ | 4.4 |
| $Ca_3(PO_4)_2$ | 3.8 |
| $Mg_3(PO_4)_2$ | 29.4 |
| $SiO_2$ | 2.9 |
| Other components | 6.3 |
|  | 100.0 |

The original −100 mesh feed contains 51.9% −325 mesh material. The product is 88.5% −325 mesh. In this test 4.4% of the original phosphate eventually ends up in the residual filtrate solution. Approximately 73% of the magnesium originally present in the 500 ml. of feed solution is combined into the solid product and 27% remains in the filtrate.

EXAMPLE II

The procedure of Example I is repeated except that the feed material is a Florida phosphate concentrate containing 30.7% $P_2O_5$, and the reaction temperature is 200° C. (The feed has a particle size of −100 mesh with 80% having a size less than 210 microns. The dried product contains 16.3% $P_2O_5$ and 60.2% of the phosphate is citrate soluble. Approximately 11.4% of the phosphate in the feed material is citrate soluble.)

EXAMPLE III

The procedure of Example II is repeated except that the $H_2SO_4$ (96%) acid addition is varied using 100, 200, 230, 310 and 460 lbs./ton respectively for the hydrothermal exchange reaction (see FIG. 1). The optimum conversion is obtained with an acid addition of about 200 lbs./ton. With acid additions greater than 200 lbs./ton substantially greater amounts of phosphate are present in the filtrate as shown in FIG. 2. Therefore, although more phosphate in the original feed material is reacted, appreciably greater quantities are lost to the residual filtrate solution. This soluble phosphate can be recovered by neutralizing the product slurry to about 8.0 pH with $NH_3$ or CaO prior to filtration but it may be preferable to avoid the expense of such an operation.

EXAMPLE IV

The procedure of Example II is repeated a number of times except that the $MgSO_4/P_2O_5$ mole ratio in the feed slurry is varied between 0 and 6.0. This variation is accomplished both by varying the concentration of the magnesium sulfate feed solution and by varying the solution ratio in the feed slurry. The results are shown plotted in FIG. 3. A maximum $Mg/P_2O_5$ ratio in the product is obtained when the $MgSO_4/P_2O_5$ ratio in the feed slurry reaches approximately 3.5. This is about 116% of the $MgSO_4$ amount indicated by the following reaction:

$$Ca_3(PO_4)_2 + 3MgSO_4 \rightarrow 3CaSO_4 + Mg_3(PO_4)_2$$

The $Mg/P_2O_5$ ratio in $Mg_3(PO_4)_2$ is 3.0.

EXAMPLE V

The procedure of Example II is repeated a number of times except that the reaction temperature is varied from 160° C. to 220° C. The conversion at 160° C. is essentially nil and the product has approximately the same citrate solubility. However, at 180° C. some improvement is obtained and at 200° C. the conversion has risen to greater than 50%. The results are plotted in Curve A of FIG. 4. Curve B of FIG. 4 shows that the percentage of phosphate taken into solution from the phosphate feed is reduced as the reaction temperature is increased.

EXAMPLE VI

The procedure of Example II is repeated a number of times using a variety of reaction periods from 30 minutes to 6 hours. The results as plotted in FIG. 5 show that a reaction time of at least 40 minutes, preferably at least one hour, is required for a reasonable degree of conversion.

EXAMPLE VII

The procedure of Example II is repeated except that a solution of 200 g./l. of $MgCl_2$ is substituted for the $MgSO_4$ solution. Eleven percent of the phosphate is taken into solution and is found in the filtrate, but only 7.1% of the phosphate in the solid product is citrate soluble. This is actually less than the 11.4% of the phosphate in the untreated feed material that was citrate soluble.

EXAMPLE VIII

The procedure of Example II is repeated except that a 200 gm./l. of $Na_2SO_4$ solution was substituted for the $MgSO_4$ solution. Approximately 15.9% of the phosphate in the product is citrate soluble. This is only a slightly greater citrate solubility than that of the feed material. About 12% of the phosphate is taken into solution during the reaction and is found in the residual filtrate.

EXAMPLE IX

The procedure of Example II is repeated except that the acid addition is 100 lbs./ton and the $MgSO_4/P_2O_5$ ratio in the feed slurry is 3.0. Approximately 35.1% of the phosphate in the product is citrate soluble.

EXAMPLE X

The procedure of Example II is repeated except that in place of the $MgSO_4$ solution a synthetic sea water bittern is used which contains:

|  | G./l. |
|---|---|
| $MgSO_4$ | 76.9 |
| $MgCl_2$ | 109.6 |
| KCl | 23.9 |
| NaCl | 152.5 | and the acid addition is varied between 0 and 100 lbs./ton. The $MgSO_4/P_2O_5$ ratio in the feed slurry is 3.0. The results are plotted in the curve of FIG. 6.

EXAMPLE XI

The procedure of Example II is repeated except that a 140 pound per ton addition of 86% $H_3PO_4$ is substituted for the sulfuric acid addition. This phosphoric acid addition contains approximately the same number of hydrogen atoms as a 200 pound per ton addition of 96% $H_2SO_4$. The dried product contains approximately 19% $P_2O_5$, and 55.0% of the phosphate is citrate soluble.

EXAMPLE XII

The procedure of Example II is repeated except that a 402 pound per ton addition of 37% HCl is substituted for the sulfuric acid addition. This hydrochloric acid addition contains approximately the same number of hydrogen atoms as a 200 pound per ton addition of 96% $H_2SO_4$. The dried product contains 16.6% $P_2O_5$, and 58.0% of the phosphate is citrate soluble.

EXAMPLE XIII

The procedure of Example II is repeated except that a 364 pound per ton addition of 70.5% $HNO_3$ is substituted for the sulfuric acid addition. This nitric acid addition contains approximately the same number of hydrogen atoms as a 200 pound per ton addition of 96% $H_2SO_4$. The dried product contains 16.3% $P_2O_5$, and 53.9% of the phosphate is citrate soluble.

EXAMPLE XIV

A number of experiments are performed using in each case a 50-gram sample of the same phosphate concentrate used in Example III which is acidulated by pugging the material with water and various additions of sulfuric acid. The moisture content of the pugged material is equivalent to approximately 20% to 25% $H_2O$. The acid addition is varied, using 100, 200, 300, 400 and 600 pounds respectively of 96% $H_2SO_4$ per ton of phosphate concentrate. The pugged material is placed in a closed container which has a capillary vent hole, and cured in an oven at 66° C. for seven days. The cured product is then dried at 100° C. and analyzed for total $P_2O_5$ content and citrate soluble $P_2O_5$ content. The results are plotted in FIG. 7 to show the relationship between the percentage of phosphate that is citrate soluble and the amount of acidulating acid added. Comparing this curve with FIG. 1, plotted according to the results in Example III, shows that the hydrothermal exchange of this invention utilizes the sulfuric acid addition much more effectively than the direct acidulation, that is the absence of the $MgSO_4$. For example, when a 200 pound per ton addition of sulfuric acid is used, about 60% of the phosphate in the hydrothermal exchange product is citrate soluble while only approximately 25% of the phosphate in the directly acidulated product is citrate soluble.

EXAMPLE XV

The procedure of Example II is repeated except that no acid is added. The dried product contains 21.8% $P_2O_5$, and approximately 22% of the phosphate is citrate soluble. A 50 gram sample of this material is moistened with water and pugged with a 200 pound per ton addition of 96% $H_2SO_4$. The moisture content of the pugged product is equivalent to about 14% $H_2O$. The pugged product is placed in a closed container which has a capillary vent hole and cured in an oven at 66° C. for seven days. The cured product is then dried at 100° C. and analyzed for total $P_2O_5$ content and citrate soluble $P_2O_5$ content. The dried product contains 20.0% $P_2O_5$, and approximately 46% of the phosphate content is citrate soluble. This procedure produces a higher citrate soluble content than by direct acidulation (Example XIV), but the citrate soluble phosphate content is less than that obtained with a 200 pound per ton acid addition by the hydrothermal exchange procedure of this invention, for example, as illustrated by Example II.

EXAMPLE XVI

In the following procedure, sulfuric acid is generated in situ. A 100-gram sample of −100 mesh Florida phosphate concentrate, having a phosphate content of 30.7% expressed as $P_2O_5$, is slurried with 500 ml. of a magnesium sulfate solution containing 40.0 grams/liter of $Mg^{++}$ ion (197 grams/liter $MgSO_4$). This slurry thus contains about 3.8 moles of $MgSO_4$ per mole of phosphate expressed as $P_2O_5$ present. Then 3.27 grams of elemental sulfur is added to this slurry. This sulfur addition is equivalent to the sulfur content of 200 lb./ton addition of 9.6% sulfuric acid. The slurry is transferred to a 2-liter autoclave made of 316 Stainless Steel and having a double impeller. The reactor is a standard unit commercially available as Parr 2L Reactor 316 SS. The reactor is closed, the agitator is started, and the slurry is heated to 200° C. The reactor is then pressurized with air to give a total pressure of 300 p.s.i.g. The ambient pressure 200° C. is about 200 p.s.i.g., and therefore the air overpressure is approximately 100 p.s.i.g. A flow of air equivalent to 587 cc./minute (measured at 70° F. and atmospheric pressure) is passed through the reactor for a reaction period of 2 hours. The temperature is maintained at 200° C. At the end of this 2-hour period, the reactor is cooled quickly with water to "quench" the reaction. The cooled product slurry is filtered, and the filter cake is washed at least four times with 50 ml. of water each time. The washed product is dried at 100° C. to give a product weighing 150.6 gm. This dried product contains 17.8% $P_2O_5$, and 53.0% of the phosphate is citrate soluble. (Approximately 11.4% of the phosphate in the feed material is citrate soluble.)

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for converting calcium phosphate rock to a form of magnesium phosphate having an increased proportion of citrate-soluble phosphate and more easily accessible for fertilizer use comprising the steps of:
   (a) treating said calcium phosphate rock in finely divided form with a mixture comprising an acidic aqueous solution of magnesium sulfate at a temperature of at least 170° C., the amount of magnesium sulfate in said solution being at least 2 moles per mole of $P_2O_5$ equivalent in the rock being treated and the acidity being equivalent to at least 100 pounds of 96% sulfuric acid per ton on said rock being treated, and at a pressure of at least the ambient pressure at the temperature being used, for a period of at least 20 minutes; and
   (b) separating the solid reaction product of magnesium phosphate and unreacted solids from the resultant liquid.

2. The process of claim 1 in which sulfuric acid is used.

3. The process of claim 1 in which said calcium phosphate rock is predominantly of a particle size less than 100 mesh.

4. The process of claim 2 in which the magnesium sulfate solution is used in an amount such that the proportion of magnesium sulfate is approximately 3–3.5 moles of magnesium sulfate per mole of phosphate calculated as $P_2O_5$ in the phosphate rock feed.

5. The process of claim 2 in which the amount of sulfuric acid is equivalent to 50–500 pounds of 96% sulfuric acid per ton of said phosphate rock.

6. The process of claim 2 in which the amount of sulfuric acid is equivalent to 200–500 pounds of 96% sulfuric acid per ton of said phosphate rock.

7. The process of claim 2 in which said treatment is conducted for a period of at least 40 minutes.

8. The process of claim 2 in which said phosphate rock feed has a particle size predominantly less than 100 mesh, said temperature is in the range of 180–210° C., and said treatment is conducted for a period of at least 40 minutes.

9. The process of claim 8 in which said magnesium sulfate solution is used in an amount such that the ratio of $MgSO_4$ is approximately 3.5 moles per mole of phosphate calculated as $P_2O_5$ in said phosphate rock feed.

10. The process of claim 8 in which said sulfuric acid is used in an amount equivalent to at least 200–500 pounds of 96% of concentrated sulfuric acid per ton of phosphate feed rock.

11. The process of claim 10 in which said treatment is conducted for a period of at least 1 hour.

12. The process of claim 1 in which the acid in said acidic solution is phosphoric acid.

13. The process of claim 1 in which the acid in said acidic solution is nitric acid.

14. The process of claim 1 in which the acid in said acidic solution is hydrochloric acid.

15. The process of claim 1 in which the acid is generated in situ.

16. The process of claim 15 in which the acid is sulfuric acid.

17. The process of claim 16 in which said sulfuric acid is generated by the oxidation of elemental sulfur present in the reaction mass.

18. The process of claim 17 in which said oxidation is effected by blowing air through said reaction mass.

19. The process of claim 16 in which said sulfuric acid is generated by the oxidation of a sulfide present in the reaction mass.

20. The process of claim 19 in which said oxidation is effected by blowing air through said reaction mass.

References Cited

UNITED STATES PATENTS

| | | | |
|---|---|---|---|
| 3,383,167 | 5/1968 | Blumberg et al. | 23—105 |
| 3,446,612 | 5/1969 | Taylor | 71—40 |

REUBEN FRIEDMAN, Primary Examiner

C. N. HART, Assistant Examiner

U.S. Cl. X.R.

71—40, 41, 62, 64; 23—105